No. 789,461. PATENTED MAY 9, 1905.
W. R. SMITH.
EYEGLASSES, &c.
APPLICATION FILED DEC. 30, 1904.
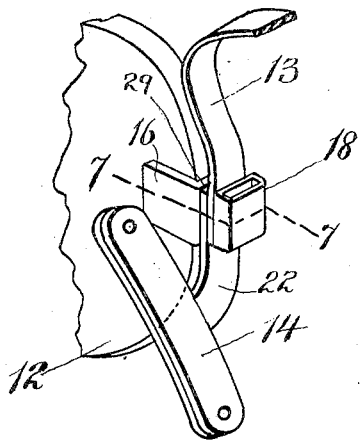
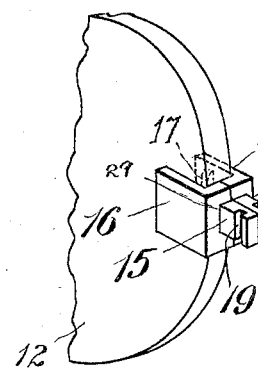
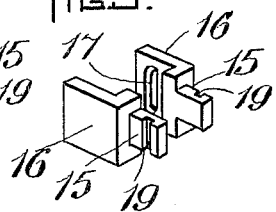
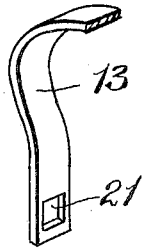
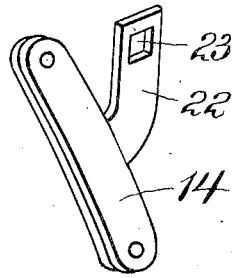
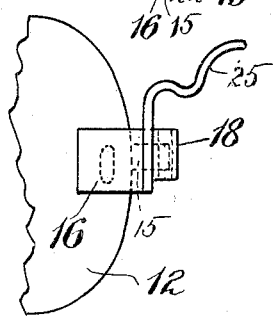
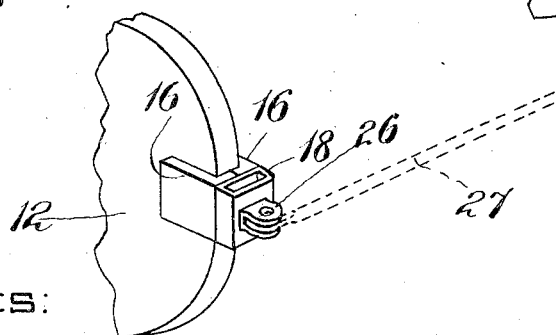
WITNESSES:
INVENTOR No. 789,461. Patented May 9, 1905.

UNITED STATES PATENT OFFICE.

WILLIAM R. SMITH, OF BUFFALO, NEW YORK.

EYEGLASSES, &c.

SPECIFICATION forming part of Letters Patent No. 789,461, dated May 9, 1905.

Application filed December 30, 1904. Serial No. 238,986.

*To all whom it may concern:*

Be it known that I, WILLIAM R. SMITH, of Buffalo, in the county of Erie and State of New York, have invented certain new and useful Improvements in Eyeglasses, &c., of which the following is a specification.

This invention relates to means for mounting rimless lenses in eyeglasses and spectacles, and has for its object to provide improved means for securing such lenses to the connecting-bow in spectacles and to the bow and nose-piece in eyeglasses without the use of screws and without forming orifices through the lenses.

The invention consists in the improvements which I will now proceed to describe and claim.

Of the accompanying drawings, forming a part of this specification, Figure 1 represents a perspective view showing my invention as embodied in eyeglasses. Fig. 2 represents a view similar to Fig. 1, parts being removed. Figs. 3, 4, 5, and 6 represent perspective views of detached parts. Fig. 7 represents a section on line 7 7 of Fig. 1. Fig. 8 represents a front elevation showing the invention embodied in spectacles. Fig. 9 represents a perspective view showing a modification which includes a hinge member adapted to connect a temple with a lens.

The same reference characters indicate the same parts in all the figures.

In the drawings, 12 represents a lens which, as shown in Figs. 1 and 2, belongs to a pair of eyeglasses. 13 represents the bow which connects the two lenses of the pair, and 14 represents one of the nose-clamps.

15 15 represent two separable parts, which when assembled form a post or shank, as shown in Fig. 2. The said shank parts are provided at their inner ends with offset jaws 16, formed to bear on and engage the opposite sides of the lens, said jaws having teeth or tenons 17, which enter grooves formed for their reception in the lens. The shank parts are also provided at their outer portions with means for engaging a clamp 18, which is adapted to hold the said parts together and to hold the jaws in engagement with the lens, the said means as here shown comprising grooves 19, formed in the outer sides of the shank parts. The clamp 18 is preferably a flattened tube having a slot 20 in one side, the slot being closed at one end, as shown in Fig. 6. The edges of the slot enter the grooves 19, and the closed end of the slot bears on the upper side of the shank. The clamp therefore bestrides the shank and holds its parts together. The bow 13 is provided near each end with an orifice 21, adapted to receive the shank, and the arm 22 of the nose-clamp is provided with a similar orifice 23 for the same purpose. The form of the shank and of the orifices 21 23 is angular to prevent the bow and nose-clamp from turning on the shank. As here shown, the shank is square in cross-section, and the orifices are correspondingly formed.

In assembling the parts the shank parts are brought together, with the jaws on opposite sides of the lens, as shown in Fig. 2. The nose-piece arm and the bow are then slipped onto the shank, and finally the clamp is applied to the shank, the bow and nose-piece arm being then confined between the clamp and the shoulder 29, formed by the bases of the offset jaws. The clamp may be held in engagement with the shank by friction alone, or it may be secured against displacement by bending inwardly portions of the side of the clamp at the mouth of the slot.

Fig. 8 shows a bow 25 suitable for spectacles and adapted to bear on the wearer's nose. The bow is connected with a lens by the two-part shank, the jaws, and the clamp.

Fig. 9 shows the clamp 18 provided with a hinge member 26, adapted to engage a hinge member on a spectacle-temple 27. In this case the clamp bears on the shoulder formed at the inner ends of the jaws.

It will be seen that no screws are employed and that the parts described are adapted to be economically formed by stamping operations.

The clamp 18 serves as a detachable head or enlargement which coöperates with the shoulder 29 in confining the bow or the bow and nose-piece arm on the shank.

I claim—

1. A lens-mount comprising a post or shank having offset jaws for engagement with a lens, the bases of said jaws forming a shoulder, a head adapted to detachably engage the shank, and an apertured bow confined on the shank between the shoulder and head, the shank and the aperture in the bow being formed to prevent the turning of the bow on the shank.

2. A lens-mount comprising a post or shank having offset jaws for engagement with a lens, the bases of said jaws forming a shoulder, a head adapted to detachably engage the shank, and an apertured bow and a nose-clamp having an apertured arm, both confined on the shank between the shoulder and head, the form of the shank and of the apertures in the bow and arm being such as to prevent the turning of the bow and nose-clamp upon the shank.

3. A lens-mount comprising a post or shank composed of two separable parts having means at their outer portions for engaging a clamp, and jaws at their inner portions for engaging a lens, a clamp which engages the said parts to hold them together and to hold the jaws in engagement with the lens, and an apertured bow engaged with the shank between the jaws and the clamp, the shank and the aperture in the bow being formed to prevent the bow from turning on the shank.

4. A lens-mount comprising a post or shank composed of two separable parts having means at their outer portions for engaging a clamp, and jaws at their inner portions for engaging a lens, a clamp which engages the said parts to hold them together and to hold the jaws in engagement with the lens, and an apertured bow and an apertured nose-piece arm, both engaged with the shank between the jaws and the clamp, the shank and the apertures in the bow and arm being formed to prevent the bow and nose-piece from turning on the shank.

5. A lens-mount comprising a post or shank composed of two separable parts, said shank being angular in cross-section and having grooves in its outer sides, lens-engaging jaws formed on the inner ends of said parts, and a clamp formed to bestride the shank and to engage the grooves thereof.

In testimony whereof I have affixed my signature in presence of two witnesses.

WILLIAM R. SMITH.

Witnesses:
   DANIEL W. ALLEN,
   MILLARD F. BOWEN.